(12) United States Patent
Hwang (10) Patent No.: US 12,414,179 B2
(45) Date of Patent: Sep. 9, 2025

(54) DEVICE TO DEVICE COMMUNICATION SYSTEM

(71) Applicant: Owlynk Co., Ltd., Seongnam-si (KR)

(72) Inventor: Shin Hwan Hwang, Yongin-si (KR)

(73) Assignee: Owlynk Co., Ltd., Seongnam-si (KR)

( * ) Notice: Subject to any disclaimer, the term of this patent is extended or adjusted under 35 U.S.C. 154(b) by 554 days.

(21) Appl. No.: 17/950,129

(22) Filed: Sep. 22, 2022

(65) Prior Publication Data

US 2023/0087033 A1 Mar. 23, 2023

(30) Foreign Application Priority Data

Sep. 23, 2021 (KR) .......................... 10-2021-0125699

(51) Int. Cl.
*H04W 76/15* (2018.01)
*H04W 8/22* (2009.01)
*H04W 76/18* (2018.01)

(52) U.S. Cl.
CPC .............. *H04W 76/15* (2018.02); *H04W 8/22* (2013.01); *H04W 76/18* (2018.02)

(58) Field of Classification Search
CPC ........ H04W 76/15; H04W 76/18; H04W 8/22
See application file for complete search history.

(56) References Cited

U.S. PATENT DOCUMENTS 10,018,702 B2    7/2018  Schrabler et al.
10,433,310 B2 *  10/2019 Kim ..................... G08G 1/162
11,271,943 B2 *  3/2022  Urabe ................... H04L 63/107
2004/0109508 A1* 6/2004  Jeon ..................... H04L 27/2675
                                                              375/260
2020/0355816 A1* 11/2020 Ishikawa ................. G01S 7/354
2021/0311155 A1* 10/2021 Shpak .................. H04B 7/0617
2022/0329295 A1* 10/2022 Park ...................... H04L 5/0057

(Continued)

FOREIGN PATENT DOCUMENTS

KR   10-2010-0029153 A    3/2010
KR   10-2014-0080514 A    6/2014

(Continued)

OTHER PUBLICATIONS

Non-final Office Action mailed Jul. 13, 2022 for Korean Application No. 10-2021-0125699.

(Continued)

*Primary Examiner* — Parth Patel (74) *Attorney, Agent, or Firm* — Insight Law Group, PLLC; Seung Lee (57) ABSTRACT

Provided is a device-to-device (D2D) communication system for communication between a plurality of devices by a peer-to-peer (P2P) method, wherein, when a transmitting device transmits a connection request, which includes a reception phase difference, in the same radio signal through at least two omnidirectional antennas spaced a certain distance from each other, a receiving device located near the transmitting device receives the connection request, calculate a phase difference of the radio signal, and establish a connection in response to the connection requests only when a difference between the calculated phase difference and the reception phase difference included in the connection request is equal to or less than a set threshold.

6 Claims, 6 Drawing Sheets

(56) References Cited

U.S. PATENT DOCUMENTS

| | | | | |
|---|---|---|---|---|
| 2023/0087033 A1* | 3/2023 | Hwang | ............... | H04B 7/0602 |
| | | | | 370/329 |
| 2023/0184515 A1* | 6/2023 | Hwang | .................. | F42B 15/01 |
| | | | | 244/3.19 |
| 2023/0413238 A1* | 12/2023 | Ryu | ..................... | H04B 7/0617 |
| 2024/0334410 A1* | 10/2024 | Kim | ....................... | H04B 1/525 |
| 2025/0052849 A1* | 2/2025 | Jung | ..................... | G01S 5/0221 |

FOREIGN PATENT DOCUMENTS

| | | |
|---|---|---|
| KR | 10-2016-0050083 A | 5/2016 |
| KR | 10-2016-0112551 A | 9/2016 |

OTHER PUBLICATIONS

Notice of Allowance mailed Jan. 19, 2023 from the Korean Intellectual Property Office for Korean Application No. 10-2021-0125699.

\* cited by examiner

DEVICE TO DEVICE COMMUNICATION SYSTEM

CROSS-REFERENCE TO RELATED APPLICATION(S)

This application claims priority from Korean Patent Application No. 10-2021-0125699, filed on Sep. 23, 2021, in the Korean Intellectual Property Office, the disclosure of which is incorporated herein by reference in its entirety.

BACKGROUND

1. Field

The following description relates to a communication system, and more particularly, to a system for direct communication between a plurality of devices.

2. Description of Related Art

In device-to-device (D2D) communication, direct communication is established between devices, i.e., by a peer-to-peer (P2P) method, without using a base station, a wireless router, or the like. D2D communication is advantageous in terms of reduction of delay and power consumption, because direct communication is established between adjacent devices.

D2D communication has been used for vehicle-to-everything (V2X) communication in the field of autonomous vehicles, drone-to-drone communication, etc.

In D2D communication, direct communication is established with all neighboring devices, and therefore when there are multiple neighboring devices, a delay may occur in a communication connection and thus a communication connection between devices may not be smooth or may not be possible. For example, in V2V communication, a communication connection with hundreds to thousands of vehicles may be simultaneously attempted in a traffic jam area in a city, which would prevent smooth V2V communication.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to providing a communication system for smoothly establishing device-to-device (D2D) connections between a device and multiple devices even when there are multiple devices near the device.

Additionally, the following description relates to providing a communication system for establishing a D2D connection between a device and another device located in a selected direction among multiple devices that are located near the device and receive the same connection request.

Additionally, the following description relates to providing a communication system for establishing a directional wireless communication connection without using a directional antenna.

In a general aspect, a D2D communication system is a system for communication between a plurality of devices by a peer-to-peer (P2P) method, and includes a transmitting device for transmitting a connection request, and a receiving device for receiving the connection request from the transmitting device and responding to or ignoring the connection request.

The transmitting device is a device configured to start a connection for D2D communication, and may transmit a connection request, including a reception phase difference, in the same radio signal through at least two omnidirectional antennas spaced a certain distance from each other.

The receiving device is a device that receives a connection request transmitted from the transmitting device and transmits a response for establishing a connection or does not process the connection request, and may receive two radio signals including a connection request transmitted from the transmitting device, calculate a phase difference between the two radio signals, establish a connection in response to the connection request only when a difference between the calculated phase difference and the reception phase difference included in the connection request is equal to or less than a set threshold, and discard the connection request without processing the connection request when the difference is greater than the set threshold.

In a general aspect, a transmitting device of a D2D communication system may transmit the same radio signal for a given time while periodically switching antennas by TDM.

In another general aspect, a transmitting device of a D2D communication system transmits radio signals of different frequencies through antennas by frequency division multiplexing (FDM).

In another general aspect, a transmitting device of a D2D communication system transmits radio signals of different frequencies through antennas, in response to the same connection request. In this case, the frequencies of the radio signals transmitted from the transmitting device through antennas may be integer multiples of a frequency of a radio signal transmitted through an antenna for transmitting a radio signal of a lowest frequency. A receiving device may calculate a phase difference from a ratio between a positive peak value and a negative peak value of a signal obtained by synthesizing the radio signals transmitted from the transmitting device through the antennas.

In another general aspect, a transmitting device of a D2D communication system may sequentially establish connections with neighboring receiving devices by transmitting a connection request while changing a reception phase difference at set time intervals to establish communication connections with all of the neighboring receiving devices.

Other features and aspects will be apparent from the following detailed description, the accompanying drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The foregoing and further aspects will be implemented through embodiments described with reference to the accompanying drawings below. It should be understood that components of embodiments can be implemented in various combinations in the embodiments unless mentioned otherwise and as long as there is no contradiction between components. Each block of block diagrams may represent a physical component in some cases or may be a logical representation of part of functions of a physical component or a function performed by a plurality of physical components. In some cases, an entity of a block or part thereof may be a set of program instructions. All or some of such blocks may be implemented by hardware, software or a combination thereof.

In device-to-device (D2D) communication, a connection should be established between devices to exchange data with each other by a peer-to-peer (P2P) connection, and thus problems may occur in establishing a connection when there are multiple devices to be connected. A connection may be established with all devices by sequentially adjusting a direction of a directional antenna after establishing a connection with devices located in a certain direction using the directional antenna, but in this case, a problem may occur in the exchange of data after the connection is established. When a transmitting device and a receiving device are movable devices and thus positions thereof are changing continuously, communication with these devices may be disconnected and data transmission and reception may not be possible.

Figure 1:
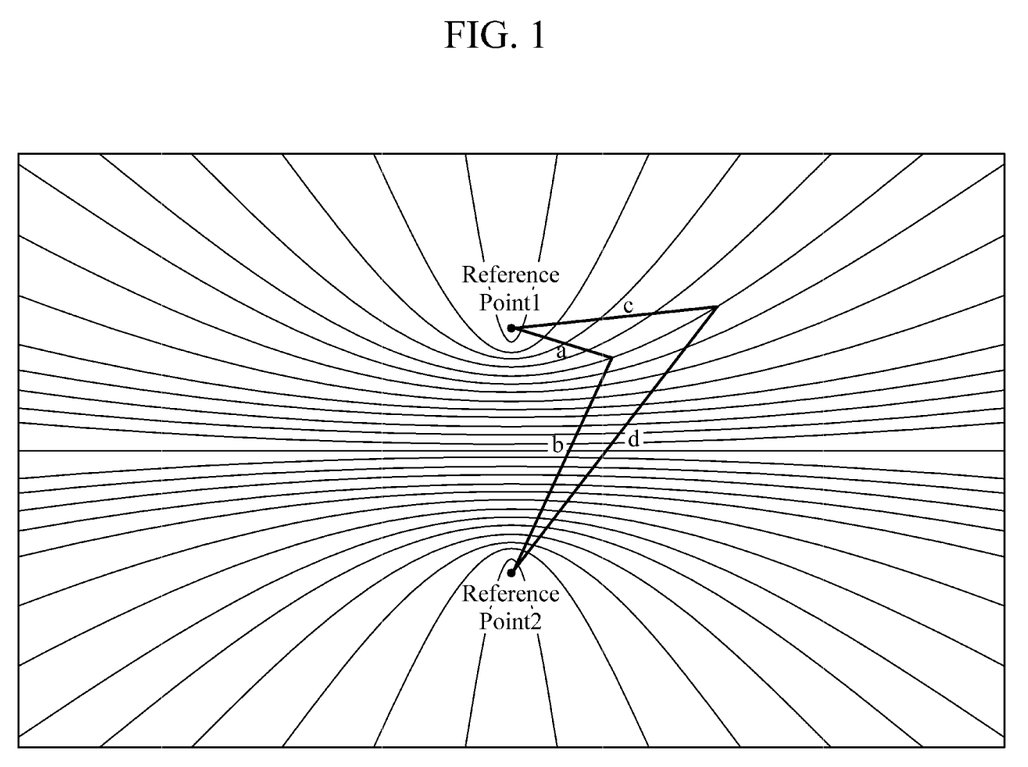
FIG. 1 illustrates hyperbolic curves representing points spaced a certain distance from two reference points.

FIG. 1 illustrates hyperbolic curves representing points spaced a certain distance from two reference points. As shown in FIG. 1, when two reference points are given on a two-dimensional (2D) plane, a set of points spaced the same distance from the reference points form hyperbolic curves on the 2D plane. FIG. 1 illustrates a plurality of hyperbolic curves, and when two points on one of the hyperbolic curves are selected, the distances from the points to the two reference points are the same (b−a=d−c).

Figure 2:
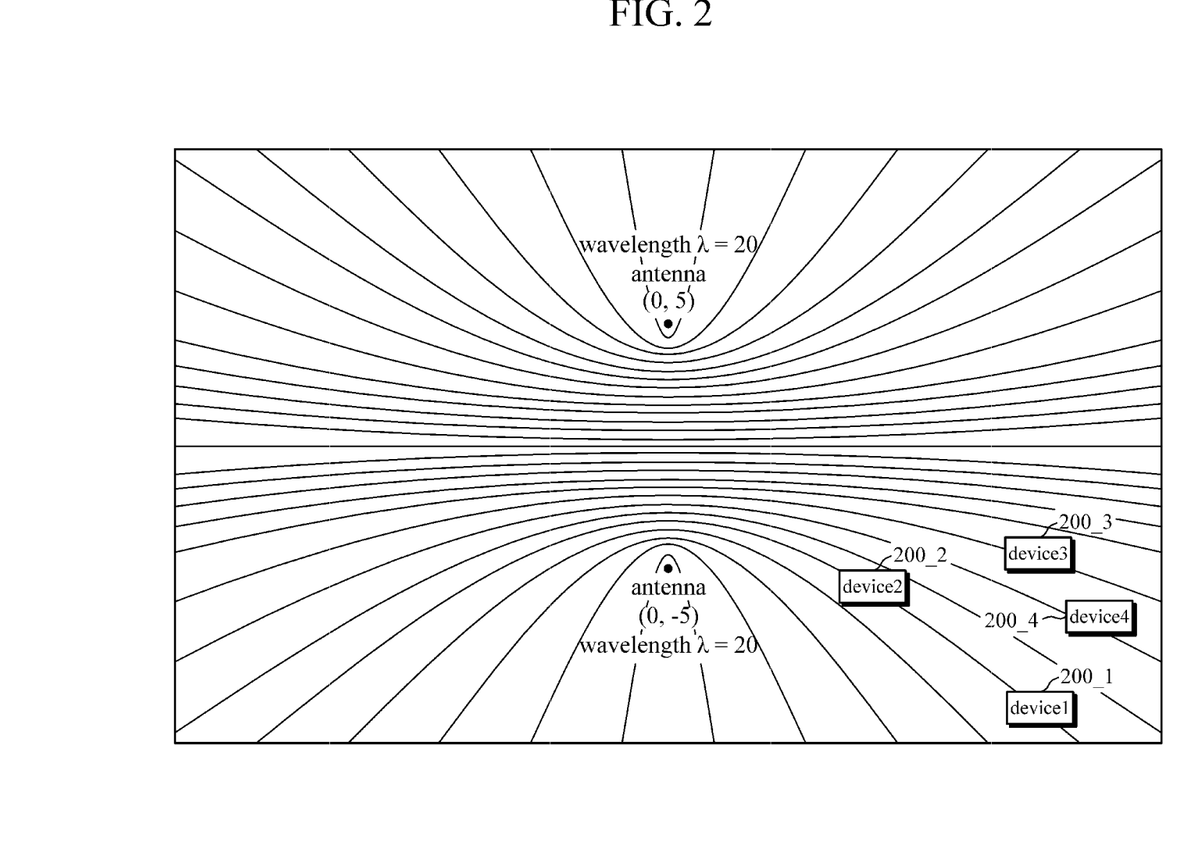
FIG. 2 illustrates hyperbolic curves representing points at which the same radio signal transmitted from two antennas have the same phase difference.

FIG. 2 illustrates hyperbolic curves representing points at which the same radio signal transmitted from two antennas have the same phase difference. In the example shown in FIG. 2, the hyperbolic curves represent a set of points of the same phase difference when the distance between the two antennas is half a wavelength of a transmitted radio signal. That is, points on a hyperbolic curve are spaced the same distance from the two antennas and phase differences between the points are the same.

Therefore, a transmitting device may establish a connection with a receiving device located in a certain direction using an omnidirectional antenna (a nondirectional antenna) by the P2P method as if a directional antenna were used. That is, the transmitting device may transmit a connection request message, which includes phase difference information observable only by a receiving device located in a certain direction, to establish a connection only with the receiving device. A receiving device located in another direction may ignore the connection request message because a phase difference between received two signals does not match the phase difference information included in the connection request message. In the example of FIG. 2, a first device 200_1 and a second device 200_2 are located on hyperbolic curves spaced the same distance from two antennas and thus have the same phase difference with respect to signals transmitted through the two antennas, and a third device 200_3 and a fourth device 200_4 have different phase differences with respect to the signals transmitted through the two antennas. Thus, when the transmitting device transmits a connection request in a connection request message including the phase difference of the first device 200_1 and the second device 200_2 as phase difference information, only the first device 200_1 and the second device 200_2 may respond to the connection request to establish a communication connection therebetween.

After a connection is established between a transmitting device and a receiving device, identification information may be assigned to the connection to allow data to be transmitted and received only between devices using the identification information.

In this case, even when there are multiple receiving devices having the same phase difference, connections may be established simultaneously, but when identification information is differently assigned to each of the connections, data may be transmitted to and received from a desired device using the identification information by the P2P method.

Figure 3:
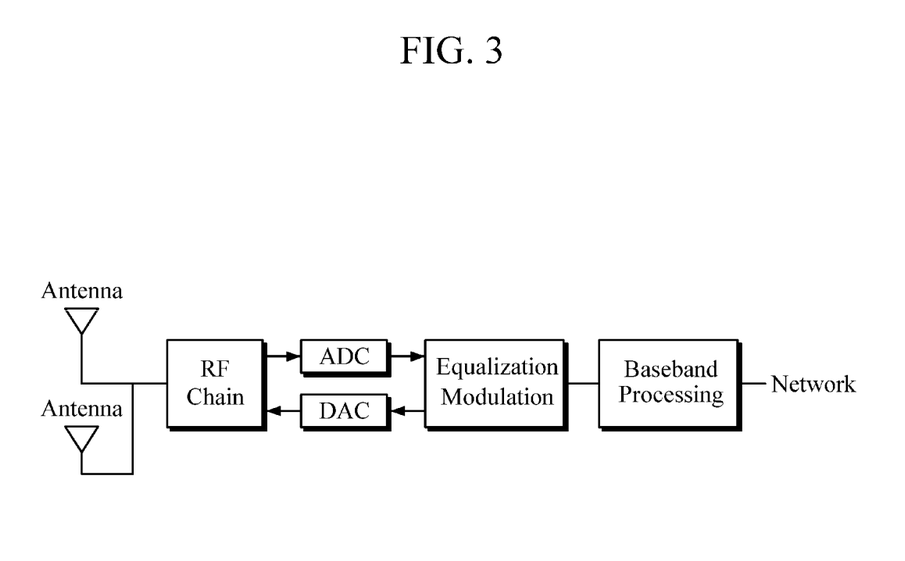
FIG. 3 is a diagram conceptually illustrating a communicator of a device using a device-to-device (D2D) communication method according to the present disclosure.
Figure 4:
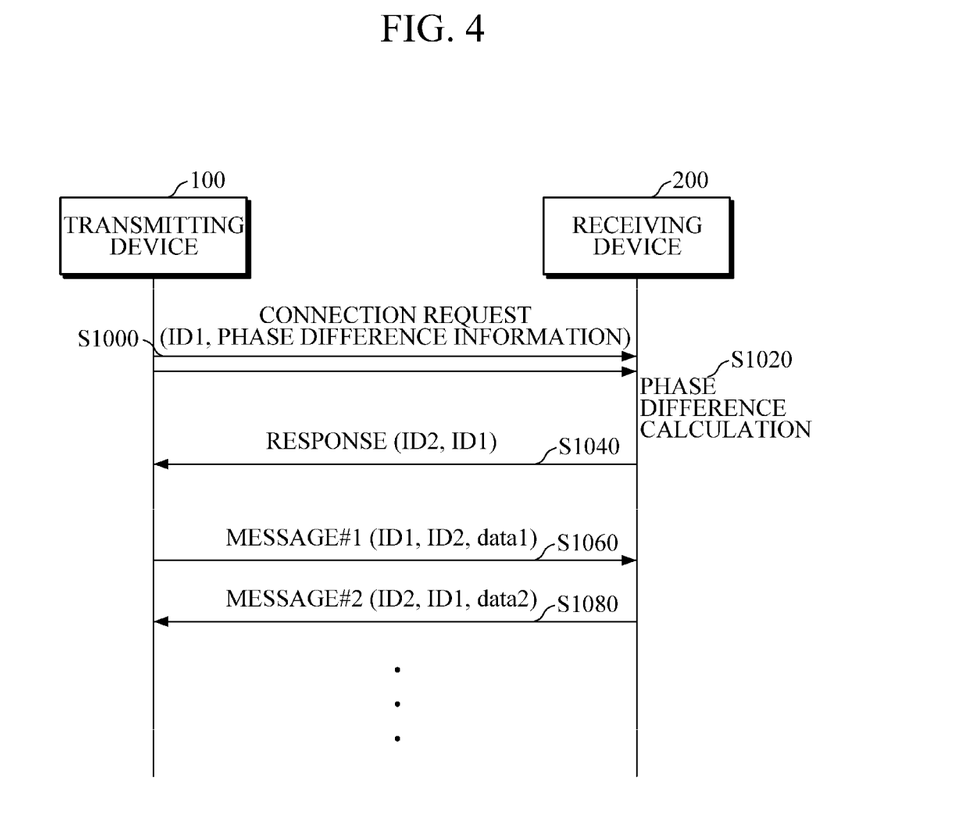
FIG. 4 is a flowchart of a D2D communication method according to the present disclosure.

FIG. 3 is a diagram conceptually illustrating a communicator of a device using a D2D communication method according to the present disclosure, and FIG. 4 is a flowchart of the D2D communication method according to the present disclosure.

A D2D communication system according to an embodiment of the present disclosure is a system that allows a plurality of devices to directly communicate with each other by the P2P method and includes a transmitting device for transmitting a connection request and a receiving device for receiving the connection request from the transmitting device and responding to the connection request or ignoring the connection request.

FIG. 3 is a diagram conceptually illustrating a communicator of a transmitting device or a receiving device, in which the same radio signal is transmitted through two antennas on the same radio-frequency (RF) path when the transmitting device is used, and a radio signal is received through one antenna and processed when the receiving device is used. The communicator of FIG. 3 is only an example, and a reception antenna may be additionally provided or three or more arrays of transmission antennas may be provided according to an embodiment of the present disclosure.

The transmitting device is a device that starts a connection for D2D communication. The transmitting device includes at least two omnidirectional antennas spaced a certain distance from each other. Preferably, antennas may be installed such that the distance between the antennas is half a wavelength of a frequency of a radio signal that is a baseband signal to be used to calculate a phase difference. In this case, the antennas are omnidirectional antennas.

The transmitting device transmits a message, which requests a communication connection using a D2D communication method, in the same radio signal through each of the omnidirectional antennas. In this case, the message transmitted from the transmitting device includes phase difference information including a reception phase difference which is connection restriction information.

That is, the transmitting device selects a phase difference in a direction in which a connection is to be established by the D2D communication method, sets the phase difference as the reception phase difference to be included in the connection request message, and transmits the connection request message. In the example of FIG. 2, the transmitting device may include a phase difference of a corresponding hyperbolic curve as connection restriction information in a connection request and transmit the connection request to start establishing a connection with devices in a direction in which the fourth device 200_4 is located.

The transmitting device modulates a connection request message of a baseband signal into a carrier signal and transmits the carrier signal.

The receiving device is a device that receives a connection request transmitted from the transmitting device. The receiving device may transmit a response for establishing a connection to the received connection request or may not process the connection request.

The receiving device receives radio signals for the connection request transmitted from the transmitting device through antennas and calculates a phase difference between the received radio signals. The receiving device compares the calculated phase difference with the reception phase difference included in the connection request, and establishes a connection in response to the connection request only when the difference between the calculated phase difference and the reception phase difference is equal to or less than a set threshold. That is, the receiving device establishes a connection in response to the connection request only when the receiving device is located in a direction in which a connection is to be established by the transmitting device. Accordingly, according to the present disclosure, it is possible to achieve an effect of connection to a receiving device located in a certain direction using an omnidirectional antenna as if a directional antenna were used. For example, when the transmitting device is to establish a connection with a receiving device having a phase difference of 54 degrees by the D2D communication method, a connection request message is transmitted by setting a reception phase difference to 54 degrees, and after a radio signal corresponding to the connection request message is received by a plurality of neighboring receiving devices, a phase difference is calculated, and a connection is established in response to the connection request only when the calculated phase difference is 54 degrees or is equal to a result of adding a set threshold to or subtracting the set threshold from 54 degrees (e.g., when the calculated phase difference is in a range of 52 to 56 degrees when the set threshold is 2 degrees). The receiving device may ignore the connection request when a connection has already been established with the transmitting device.

The receiving device discards the connection request without processing the connection request when the calculated phase difference is greater than a phase difference threshold or when a connection has already been established.

The transmitting device and the receiving device may establish a connection using a phase difference and exchange data with each other regardless of a direction using device identification information exchanged in a connection procedure. In this case, the transmitting device and the receiving device may transmit data after selecting one antenna from among a plurality of transmission antennas.

A process of establishing a connection between the transmitting device 100 and the receiving device 200 and exchanging a message therebetween will be described with respect to the example shown in FIG. 4. First, the transmitting device 100 transmits a connection request message, which includes identification information ID1 thereof and a selected phase difference (reception phase difference), through at least two omnidirectional antennas (S1000). Receiving devices that are located near the transmitting device and receive radio signals including the connection request message calculate a phase difference between the radio signals transmitted through the antennas (S1020). In this case, a receiving device corresponding to a calculated phase difference between signals transmitted through the antennas, which is the same as the reception phase difference included in the connection request message (or is less by a set threshold or less than the reception phase difference), among the receiving devices establishes a connection by transmitting a response message, including identification information ID2 thereof, to the connection request message (S1040). Thereafter, the transmitting device and the receiving device may transmit and receive data using the identification information ID1 and ID2 as identification information for a D2D communication connection (S1060 and S1080).

Figure 5:
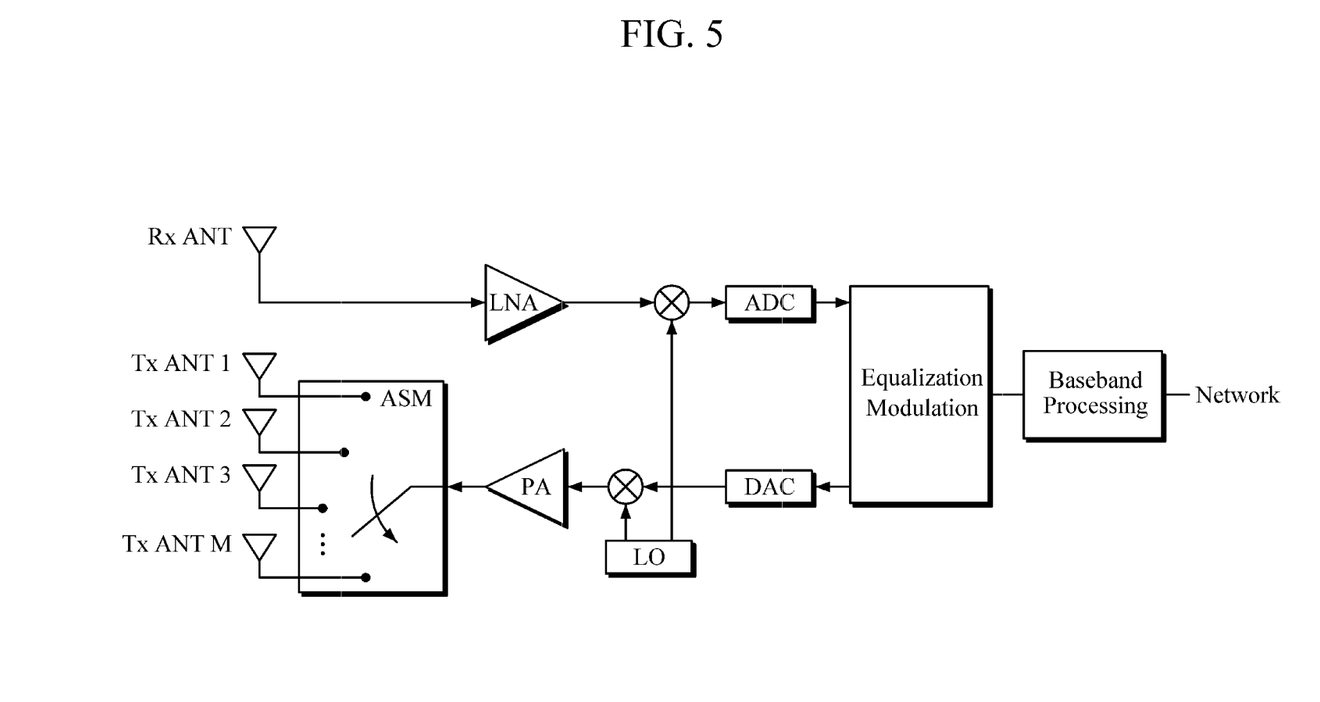
FIG. 5 is a diagram conceptually illustrating a communicator of a device using a time division multiplexing (TDM)-based D2D communication method according to the present disclosure.

FIG. 5 is a diagram conceptually illustrating a communicator of a device using a time division multiplexing (TDM)-based D2D communication method according to the present disclosure. FIG. 5 shows an example in which the communicator distributes a signal to each antenna one at a time through an antenna switch module ASM to implement time division multiplexing. According to an embodiment of the present disclosure, the communicator of FIG. 5 may be implemented by multiplexing a transmission path instead of the antenna switch module (ASM). A transmitting device of a D2D communication system according to an embodiment of the present disclosure may transmit the same radio signal for a given time while periodically switching antennas by TDM.

Radio signals simultaneously transmitted through antennas may be received by a receiving device in a form in which signals having the same frequency and different phases are combined with each other, and thus the signals should be separated from each other to calculate a phase difference. In the present disclosure, in order to facilitate the separation of the signals, the transmitting device may transmit signals transmitted through antennas by separating the signals from each other by TDM. In this case, switching is performed at the same time interval when time of the transmitting device and time of a receiving device are synchronized with each other. That is, the transmitting device is switched to select one antenna at a time and transmit a radio signal, and the receiving device separately receives radio signals transmitted through the antennas through synchronized switching.

The receiving device may calculate a phase difference from two radio signal transmitted by TDM.

A transmitting device of a D2D communication system according to another embodiment of the present disclosure may modulate radio signals at different frequencies and transmit the modulated radio signals through antennas by FDM.

The transmitting device may differently modulate carrier frequencies of radio signals to be simultaneously transmitted through two antennas so that a receiving device may distinguish the radio signals transmitted through the antennas from each other. The receiving device may distinguish the two radio signals from each other and calculate a phase difference from the two radio signals.

In a D2D communication system according to another embodiment of the present disclosure, a transmitting device may transmit baseband radio signals of different frequencies through antennas, in response to the same connection request.

Frequencies of baseband radio signals transmitted from the transmitting device through antennas are integer multiples of a frequency of a baseband radio signal transmitted through an antenna for transmitting a radio signal of a lowest frequency.

For example, when the transmitting device transmits a radio signal through two antennas and a frequency of a baseband radio signal transmitted through one of the antennas is f, a frequency of a baseband radio signal transmitted through the other antenna is 2f.

Figure 6:
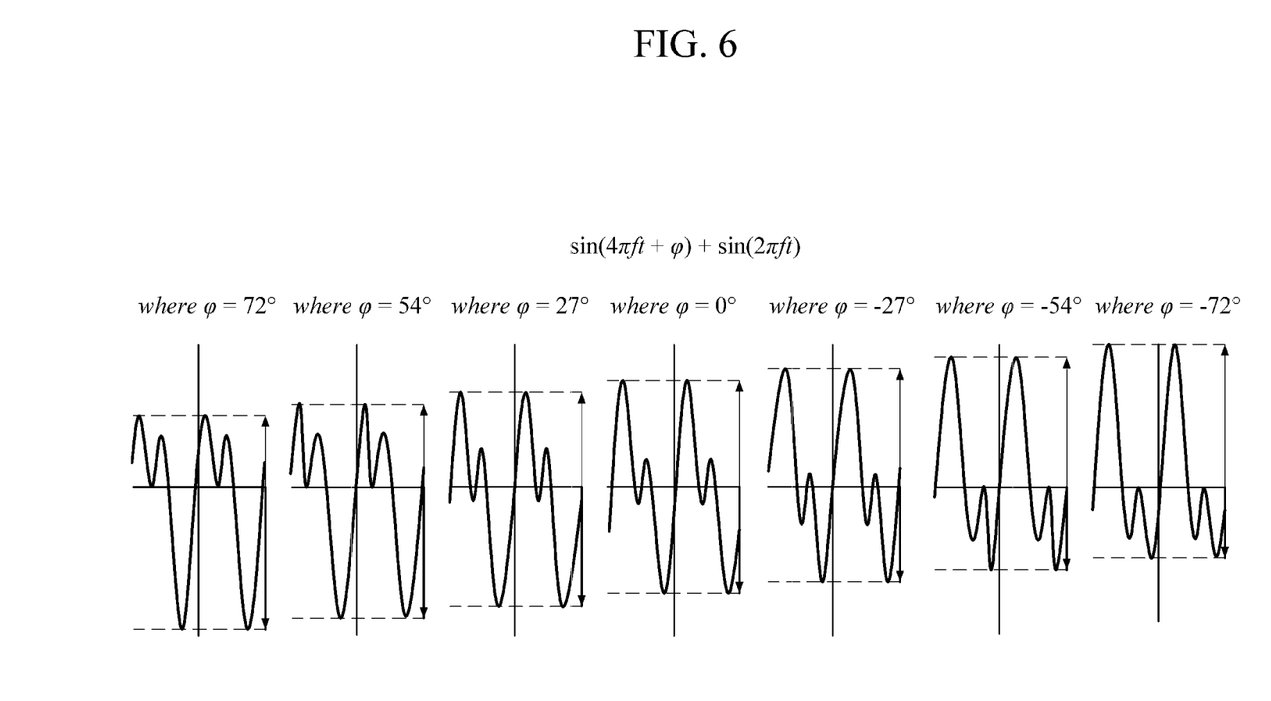
FIG. 6 illustrates a ratio between a phase difference and a peak value of a signal in a frequency division multiplexing (FDM)-based D2D communication method according to the present disclosure.

FIG. 6 illustrates a ratio between a phase difference and a peak value of a signal in a frequency division multiplexing (FDM)-based D2D communication method according to the present disclosure. Referring to FIG. 6, a ratio between a positive peak value and a negative peak value varies according to a phase difference between radio signals of different frequencies that are received by a receiving device. When a ratio between each frequency and a phase difference is calculated in advance, the receiving device is capable of calculating a phase difference from a ratio between a positive peak value and a negative peak value of a signal obtained by synthesizing radio signals transmitted from a transmitting device through antennas.

Although it is described above that TDM and FDM are used as multiplexing methods of the present disclosure, the present disclosure is not limited thereto, and code division multiplexing (CDM), orthogonal frequency division multiplexing (OFDM), or the like may be used.

A transmitting device of a D2D communication system according to another embodiment of the present disclosure may sequentially establish communication connections with neighboring receiving devices by transmitting a connection request while changing a reception phase difference at set time intervals to establish communication connections with all of the neighboring receiving devices.

The transmitting device may select a phase difference and transmit a connection request to selectively establish connections with only devices located in a certain location among a plurality of neighboring receiving devices. Accordingly, the transmitting device is capable of sequentially establishing connections with all neighboring devices by transmitting a connection request while changing a reception phase difference at the set time intervals.

According to the present disclosure, a device that is to communicate with other devices by the P2P method is capable of establishing D2D connections with multiple devices even when there are multiple devices to be connected to near the device.

According to the present disclosure, a D2D connection may be established between a device and another device located in a certain direction and selected from among multiple devices near the device.

In addition, according to the present disclosure, a directional wireless communication connection can be established without using a directional antenna.

While the present disclosure has been described above with respect to embodiments in conjunction with the accompanying drawings, the present disclosure is not limited thereto and should be interpreted to cover various modifications that will be apparent to those of ordinary skill in the art. The claims are intended to cover such modifications.

What is claimed is:

1. A device-to-device (D2D) communication system for direct communication between a plurality of devices, the system comprising:
   a transmitting device configured to transmit a connection request in the same radio signal through at least two omnidirectional antennas spaced a certain distance from each other, the connection request including a reception phase difference; and
   a receiving device configured to receive the connection request transmitted from the transmitting device, calculate a phase difference of the radio signal, and establish a connection in response to the connection request only when a difference between the calculated phase difference and the reception phase difference included in the connection request is equal to or less than a set threshold.

2. The system of claim 1, wherein the transmitting device transmits the same radio signal for a given time while periodically switching between antennas.

3. The system of claim 1, wherein the transmitting device transmits radio signals modulated at different frequencies through one of antennas.

4. The system of claim 1, wherein the transmitting device transmits radio signals of different frequencies through one of antennas in response to the same connection request, wherein the frequencies of the radio signals each transmitted through one of the antennas are integer multiples of a frequency of a radio signal transmitted through an antenna for transmission of a radio signal of a lowest frequency, and
   the receiving device calculates a phase difference from a ratio between a positive peak value and a negative peak value of a signal obtained by synthesizing the radio signals each transmitted from the transmitting device through one of the antennas.

5. The system of claim 1, wherein the transmitting device transmits connection request while changing a reception phase difference at set time intervals to sequentially establish connections with neighboring receiving devices.

6. The system of claim 1, wherein the transmitting device and the receiving device establish a connection using a phase difference and exchange data with each other regardless of a direction using device identification information exchanged in a connection procedure.

* * * * *